(12) United States Patent
Lee

(10) Patent No.: US 7,671,910 B2
(45) Date of Patent: Mar. 2, 2010

(54) INTERPOLATOR, METHOD, AND DIGITAL IMAGE SIGNAL PROCESSOR FOR ADAPTIVE FILTERING OF BAYER PATTERN COLOR SIGNAL

(75) Inventor: Hyung-Guen Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 1689 days.

(21) Appl. No.: 10/800,895

(22) Filed: Mar. 15, 2004

(65) Prior Publication Data

US 2004/0196395 A1 Oct. 7, 2004

(30) Foreign Application Priority Data

Mar. 31, 2003 (KR) ............... 10-2003-0020020

(51) Int. Cl.
 *H04N 3/14* (2006.01)
 *G06K 9/00* (2006.01)
(52) U.S. Cl. ................... 348/272; 382/162
(58) Field of Classification Search ........... 348/272, 348/274, 277, 278, 279, 280
 See application file for complete search history.

(56) References Cited

U.S. PATENT DOCUMENTS

| | | | | |
|---|---|---|---|---|
| 5,280,347 A | * | 1/1994 | Shiraishi et al. | 348/223.1 |
| 5,319,451 A | * | 6/1994 | Sasaki et al. | 348/273 |
| 5,323,233 A | * | 6/1994 | Yamagami et al. | 348/277 |
| 6,882,365 B1 | * | 4/2005 | Aoki | 348/273 |
| 7,206,021 B2 | * | 4/2007 | Sasaki et al. | 348/277 |

* cited by examiner

*Primary Examiner*—Luong T. Nguyen
(74) *Attorney, Agent, or Firm*—F. Chau & Assoc., LLC

(57) ABSTRACT

An interpolator and method for high image resolution by interpolation with adaptive filtering of Bayer pattern color signals, and a digital image signal processor implementing the same. The digital image signal processor can generate interpolation data close to actual pixel data by applying a nonlinear low pass filter (LPF) that reflects the change rate of the data centered around a center pixel and the data of the center pixel, and by simultaneously applying a LPF, a band pass filter (BPF), and a high pass filter (HPF) having linear characteristics, and can generate interpolation data that reduces aliasing (at "edges") and emphasizes a high frequency component.

14 Claims, 7 Drawing Sheets

| -1 | 0 | 2 | 0 | -1 |

HBPF

| -1 |
| 0 |
| 2 |
| 0 |
| -1 |

VBPF

| 1 | 0 | 1 |

HLLPF

| 1 |
| 0 |
| 1 |

VLLPF

FIG. 13

| -1 | 0 | -1 |
|---|---|---|
| 0 | 4 | 0 |
| -1 | 0 | -1 |

HPF

FIG. 14

| $C_{y-2,x-2}$ | $C_{y-2,x-1}$ | $C_{y-2,x}$ | $C_{y-2,x+1}$ | $C_{y-2,x+2}$ |
|---|---|---|---|---|
| $C_{y-1,x-2}$ | $C_{y-1,x-1}$ | $C_{y-1,x}$ | $C_{y-1,x+1}$ | $C_{y-1,x+2}$ |
| $C_{y,x-2}$ | $C_{y,x-1}$ | $C_{y,x}$ | $C_{y,x+1}$ | $C_{y,x+2}$ |
| $C_{y+1,x-2}$ | $C_{y+1,x-1}$ | $C_{y+1,x}$ | $C_{y+1,x+1}$ | $C_{y+1,x+2}$ |
| $C_{y+2,x-2}$ | $C_{y+2,x-1}$ | $C_{y+2,x}$ | $C_{y+2,x+1}$ | $C_{y+2,x+2}$ |

INTERPOLATOR, METHOD, AND DIGITAL IMAGE SIGNAL PROCESSOR FOR ADAPTIVE FILTERING OF BAYER PATTERN COLOR SIGNAL

BACKGROUND OF THE INVENTION

1. Field of the Invention

The present invention relates to digital cameras (e.g., a digital still camera, DSC) or a mobile phone camera and other image capturing devices, and more particularly, to a method and apparatus for processing a Bayer pattern color digital image signal output from a single sensor (e.g., CMOS image sensor, CIS) within such an image capturing device.

2. Description of the Related Art

In a digital camera (also called a digicam, or digital still camera e.g., DSC) or a mobile phone camera, in order to reduce the cost and to simplify the circuit design, a single CMOS image sensor (CIS) is used to obtain pixel data in a Bayer pattern as shown in FIG. 1. When the Bayer pattern is used, only the intensity data for any one color among green (G), blue (B), and red (R) is sensed, captured or output (or displayed) by one pixel element. Color imaging with a single detector requires the use of a Color Filter Array (CFA) which covers the CMOS pixel array. The recovery of full-color images from a CMOS pixel array requires a method of calculating values of the other color intensities at each pixel. These methods are commonly referred as color interpolation or color demosaicing algorithms. Accordingly, pixel data for the remaining 2 colors for any one (center) pixel is obtained by interpolation of color intensity data of pixels neighboring the center pixel.

The prior art interpolation method using pixel data neighboring a center pixel in order to obtain the data for the remaining two colors except the data for the center pixel in a Bayer pattern is well disclosed in U.S. Pat. No. 5,506,619, and also well disclosed in Korean Pat. KR2001-56442 which improves the U.S. method. See also, U.S. Pat. No. 3,971,065 titled "Color imaging array", issued to Bryce E. Bayer.

However, since these prior art interpolation methods are implemented by using a low pass filter (LPF) having a linear characteristic, they do not sufficiently compensate for aliasing along an "edge" (e.g., a sharp color boundary) within an image. Thus, when it is assumed that signal G in an arbitrary image has a distribution expressed by a polynomial as shown in FIG. 2, if a LPF having a linear characteristic is used for interpolation, G'3 on a line segment (interpolation), between G2 and G4, is generated by interpolation by the data of pixels (e.g., G2 and G4) neighboring (centered around) a center pixel (R in FIG. 2). As a result, the interpolated pixel data indicated by G'3 has a difference of 'Δ' from the actual pixel data G3 such that it causes aliasing along an "edge" within an image.

SUMMARY OF THE INVENTION

The present invention provides an adaptive color interpolation algorithm, and a color signal interpolator for implementing the algorithm, which can generate interpolation data (interpolated pixel data) that is closer to actual pixel data, by applying a nonlinear low pass filter (NLPF) that operates based upon the rate of gradation change of data neighboring a center pixel and the data of the center pixel, and by simultaneously applying a low pass filter (LPF), a band pass filter (BPF), and a high pass filter (HPF) having linear characteristics. Embodiments of the present invention can generate interpolation data which reduces aliasing (especially at "edges") and emphasizes a high frequency component, and provides a digital image signal processor adapted to implement the adaptive color interpolation algorithm.

An embodiment of the present invention also provides a digital image signal processing method wherein interpolation data close to actual pixel data can be generated by applying a nonlinear low pass filter (LPF) that reflects the change rate of data neighboring (e.g., centered around) a center pixel and the data of the center pixel, and by simultaneously applying an LPF, a band pass filter (BPF), and a high pass filter (HPF) having linear characteristics. The interpolation data generated reduces aliasing and emphasizes a high frequency component.

According to an aspect of the present invention, there is provided a color signal interpolator comprising first through fifth interpolators.

The first interpolator receives 5×5 pixel window data, performs first interpolation for each of center pixels R and B, wherein data that are horizontal linear low pass filter (LPF) filtered and vertical band pass filter (BPF) filtered, and data that are vertical linear LPF filtered and horizontal BPF filtered, and data that are nonlinear LPF filtered, are added, and the sum is output as interpolation data G'.

The second interpolator receives the 5×5 pixel window data, performs second interpolation from each of center pixels R and B, in which data that are high pass filter (HPF) filtered and the data that are nonlinear LPF filtered are added, and outputs interpolation data B' or R'.

The third interpolator receives the 5×5 pixel data window, performs third interpolation from each of center pixels R, B, and G, in which the data that are vertical BPF filtered and the data that are horizontal BPF filtered are added, and outputs interpolation data R', B', or G'.

The fourth interpolator receives the 5×5 pixel data window, performs fourth interpolation from each of center pixels Gr and Gb, in which the data that are vertical linear LPF filtered and horizontal BPF filtered and the data that are nonlinear LPF filtered are added, and outputs interpolation data B' or R'.

The fifth interpolator receives the 5×5 pixel data window, performs fifth interpolation from each of center pixels Gr and Gb, in which the data that are horizontal linear LPF filtered and vertical BPF filtered and the data that are nonlinear LPF filtered are added, and outputs interpolation data R' or B'.

The nonlinear LPF filtering using the 5×5 pixel window data is performed by: outputting interpolation data G' and B' by performing equations 1 and 2, respectively, for center pixel R; outputting interpolation data G' and R', by performing the equations 1 and 2, respectively, for center pixel B; and outputting interpolation data B' and R' by performing equations 3 and 4, respectively, for both center pixels Gr and Gb.

The equations 1 through 4 are:

$$C_{y,x} = \frac{(a_1 C_{y-1,x} + a_3 C_{y,x+1} + a_5 C_{y+1,x} + a_7 C_{y,x-1})}{(a_1 + a_3 + a_5 + a_7)} \quad (1)$$

$$C_{y,x} = \frac{(a_2 C_{y-1,x+1} + a_4 C_{y+1,x+1} + a_6 C_{y+1,x-1} + a_8 C_{y-1,x-1})}{(a_2 + a_4 + a_6 + a_8)} \quad (2)$$

$$C_{y,x} = \frac{(a_1 C_{y-1,x} + a_5 C_{y+1,x})}{(a_1 + a_5)} \quad (3)$$

$$C_{y,x} = \frac{(a_3 C_{y,x+1} + a_7 C_{y,x-1})}{(a_3 + a_7)} \quad (4)$$

wherein $C_{y,x}$ denotes a pixel data in y-th row and x-th column in the 5×5 pixel data window centered about the center pixel data; and wherein a1 through a8, $D_{y+a, x+b}$ and D1 through D8 are calculated by the following equations:

$$a_1 = \frac{1}{(1+D_{y-1,x}+D_1/8)} \quad a_2 = \frac{1}{(1+D_{y-1,x+1}+D_2/8)}$$

$$a_3 = \frac{1}{(1+D_{y,x+1}+D_3/8)} \quad a_4 = \frac{1}{(1+D_{y+1,x+1}+D_4/8)}$$

$$a_5 = \frac{1}{(1+D_{y+1,x}+D_5/8)} \quad a_6 = \frac{1}{(1+D_{y+1,x-1}+D_6/8)}$$

$$a_7 = \frac{1}{(1+D_{y,x-1}+D_7/8)} \quad a_8 = \frac{1}{(1+D_{y-1,x-1}+D_8/8)}$$

$$D_{y+a,x+b} = \left|\frac{(C_{y+2a,x+2b} - C_{y,x})}{(2a+2b)}\right|$$

$$D_1 = D_5 = \left|\frac{(C_{y-1,x} - C_{y+1,x})}{2}\right| \quad D_2 = D_6 = \left|\frac{(C_{y-1,x+1} - C_{y+1,x-1})}{4}\right|$$

$$D_3 = D_7 = \left|\frac{(C_{y,x+1} - C_{y,x-1})}{2}\right| \quad D_4 = D_8 = \left|\frac{(C_{y+1,x+1} - C_{y-1,x-1})}{4}\right|$$

wherein a, b are integer numbers.

According to another aspect of the present invention, there is provided a digital image signal processor. As shown in the exemplary embodiment depicted in FIG. 3, an embodiment of the digital image signal processor comprises a memory unit 310, a color signal interpolator 320, and a control unit 330.

The memory unit 310 receives input pixel data, updates and stores pixel data of 5 pixel lines or more, and according to the control of a control signal, outputs the 5×5 pixel window data centered around a center pixel.

The color signal interpolator 320, according to the control of the control signal, performs first group interpolation through fourth group interpolation: wherein in the first group interpolation, interpolation data G', B', and R' are output through first interpolation, second interpolation, and third interpolation, respectively, using the 5×5 pixel window data for center pixel R; in the second group interpolation, interpolation data G', R', and B' are output through the first interpolation, the second interpolation, and the third interpolation, respectively, using the 5×5 pixel window data for center pixel B; in the third group interpolation, interpolation data G', B', and R' are output through the third interpolation, fourth interpolation, and fifth interpolation, respectively, using the 5×5 pixel window data for center pixel Gr; and in the fourth group interpolation, interpolation data G', R', and B' are output through the third interpolation, the fourth interpolation, and the fifth interpolation, respectively, using the 5×5 window pixel window data for center pixel Gb.

The control unit determines which color the center pixel is, and according to the color of the center pixel as selected from among colors R, B, Gr, and Gb, generates the control signal indicating the first group interpolation through the fourth group interpolation.

According to still another aspect of the present invention, there is provided a color signal interpolation method comprising: receiving 5×5 pixel window data; performing first interpolation for each of center pixels R and B, wherein data are horizontal linear low pass filter (LPF) filtered and vertical band pass filter (BPF) filtered, wherein data are vertical linear LPF filtered and horizontal BPF filtered; and data are nonlinear LPF filtered. The filtered data are then added and the sum is output as interpolation data G'; receiving the 5×5 pixel window data, performing second interpolation for each of center pixels R and B wherein data are high pass filter (HPF) filtered and the data are nonlinear LPF filtered. The filtered data are added, and the sum is output as interpolation data B' or R'; receiving the 5×5 pixel window data, performing third interpolation for each of center pixels R, B, and G, wherein the data are vertical BPF filtered and the data are horizontal BPF filtered. The filtered data are added and the sum is output as interpolation data R', B', or G'; receiving the 5×5 pixel window data, performing fourth interpolation for each of center pixels Gr and Gb, wherein the data are vertical linear LPF filtered and horizontal BPF filtered and the data are nonlinear LPF filtered. The filtered data are added and the sum is output as interpolation data B' or R'; and receiving the 5×5 pixel window data, performing fifth interpolation for each of center pixels Gr and Gb, wherein the data are horizontal linear LPF filtered and vertical BPF filtered and the data are nonlinear LPF filtered. The filtered data are added and the sum is output as interpolation data R' or B'.

According to yet still another aspect of the present invention, there is provided a digital image signal processing method comprising the following steps.

Input pixel data are received, pixel data of 5 pixel lines or more are stored, and according to the control of a control signal, 5×5 pixel window data centering on a center pixel are output.

Next, color signal interpolation is performed by performing first group interpolation through fourth group interpolation according to the control of the control signal, wherein in the first group interpolation, interpolation data G', B', and R' are output through first interpolation, second interpolation, and third interpolation, respectively, using the 5×5 pixel window data for center pixel R; in the second group interpolation, interpolation data G', R', and B' are output through the first interpolation, the second interpolation, and the third interpolation, respectively, using the 5×5 pixel window data for center pixel B; in the third group interpolation, interpolation data G', B', and R' are output through the third interpolation, fourth interpolation, and fifth interpolation, respectively, using the 5×5 pixel window data for center pixel Gr; and in the fourth group interpolation, interpolation data G', R', and B' are output through the third interpolation, the fourth interpolation, and the fifth interpolation, respectively, using the 5×5 pixel window data for center pixel Gb.

A predetermined control unit determines the color of the center pixel, and according to the color of the center pixel, (one of R, B, Gr, and Gb), generates the control signal indicating the first group interpolation through the fourth group interpolation.

BRIEF DESCRIPTION OF THE DRAWINGS

The above features of the present invention will become more apparent by describing in detail exemplary embodiments thereof with reference to the attached drawings in which:

FIG. 13 is a diagram showing a weight of a high pass filter ("HPF" in FIG. 6); and FIG. 14 is a diagram showing coordinates neighboring a center pixel, $C_{y,x}$, to explain a gray scale determination method of a nonlinear low pass filter ("NLPF" in FIGS. 4, 6 and 9).

DESCRIPTION OF THE PREFERRED EMBODIMENTS

Figure 3:
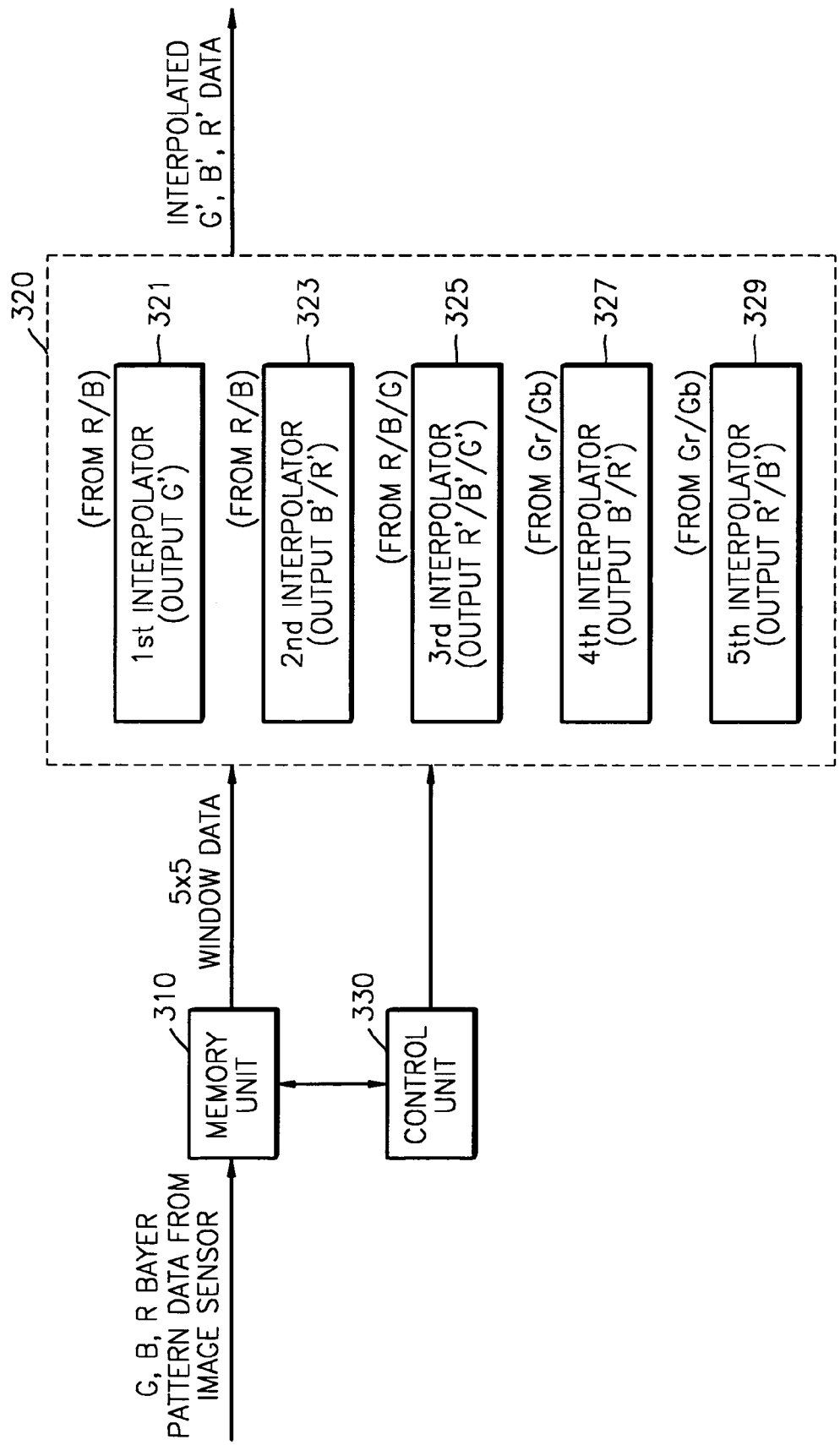
FIG. 3 is a block diagram of a digital image signal processor according to an embodiment of the present invention.

FIG. 3 is a block diagram of a digital image signal processor according to a preferred embodiment of the present invention. The digital image signal processor comprises a memory unit 310, a color signal interpolator 320, and a control unit 330.

The memory unit 310 receives input pixel data (G, B, R data), updates and stores pixel data of 5 pixel lines or more, receives a control signal, and according to the control of the control signal, outputs 5 pixel×5 pixel window data (data of a 5×5 pixel window) centered around a center pixel. Here, the input pixel data (G, B, R data) have a Bayer pattern and can be input one pixel at a time, or one line at a time.

According to the control of the control signal, the color signal interpolator 320 performs first through fourth group interpolation. In the first group interpolation, interpolation data G', B', and R' are output through first interpolation, second interpolation and third interpolation, respectively, using the 5×5 pixel data window centering on center pixel R; in the second group interpolation, interpolation data G', R', and B' are output through the first through third interpolations, respectively, using the 5×5 window centering on center pixel B; in the third group interpolation, interpolation data G', B', and R' are output through the third interpolation, fourth interpolation and fifth interpolation, respectively, using the 5×5 window centering on center pixel Gr; and in the fourth group interpolation, interpolation data G', R', and B' are output through the third through fifth interpolations, respectively, using the 5×5 window centering on center pixel Gb.

By performing these interpolations, the color signal interpolator 320 outputs interpolation data G', R', and B' from each of center pixel colors, R, B, Gr and Gb. Here, center pixel Gr indicates a case where the color of a center pixel is G and the colors of both side (right and left) pixels adjacent to the center pixel in the horizontal direction are R. Center pixel Gb indicates a case where the color of a center pixel is G and the colors of both side (right and left) pixels adjacent to the center pixel in the horizontal direction are B.

The control unit 330 selects the center pixel and determines what color the center pixel is and according to the color of the center pixel, , R, B, Gr and Gb, generates the control signal indicating the first through fourth group interpolations.

In FIG. 3, the color signal interpolator 320 comprises a first interpolator 321, a second interpolator 323, a third interpolator 325, a fourth interpolator 327, and a fifth interpolator 329. The detailed block diagrams of the first through fifth interpolators 321 through 329 are shown in FIGS. 4 through 5.

Figure 4:
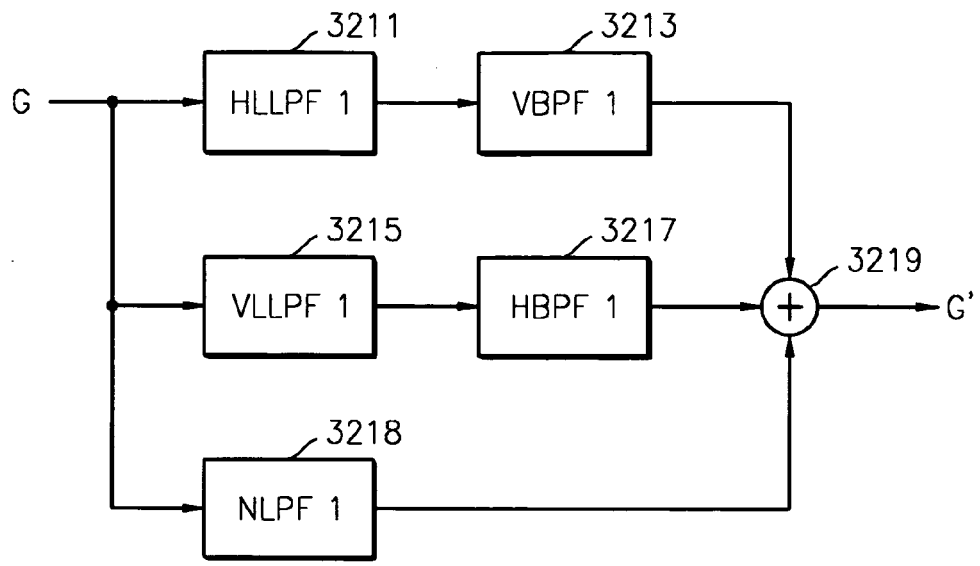
FIG. 4 is a detailed block diagram of a first interpolator of the digital image signal processor of FIG. 3.
Figure 5:
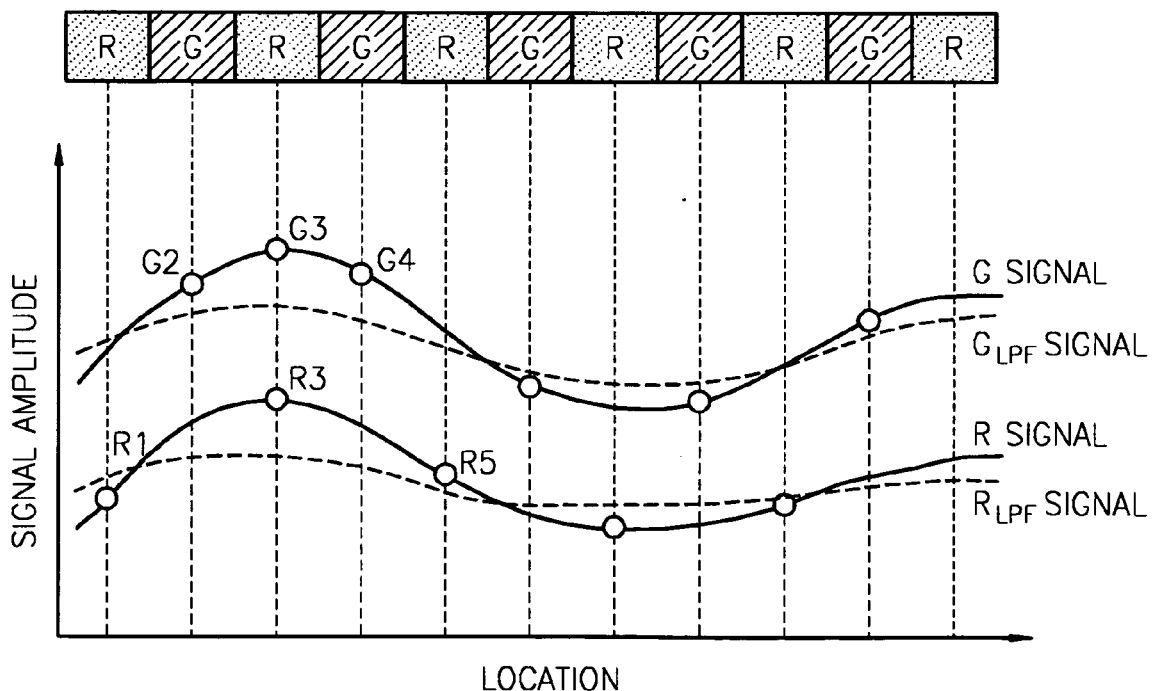
FIG. 5 is a diagram illustrating the characteristic of linear interpolation performed according to an embodiment of the present invention.

Referring to FIGS. 3 and 4, the first interpolator 321 receives the 5×5 pixel data window, performs the first interpolation, and outputs interpolation data G'. In the first interpolation for each of center pixels R and B, data are horizontal linear LPF filtered by a horizontal linear LPF (HLLPF) 3211 and vertical BPF filtered (band pass filtered) by a vertical BPF (VBPF) 3213, data are vertical linear LPF filtered by a vertical linear LPF (VLLPF) 3215 and horizontal BPF filtered by a horizontal BPF (HBPF) 3217, and data are nonlinear LPF filtered by a nonlinear LPF (NLPF) 3218, and the three filtered data outputs are added together by an adder 3219. Here, interpolation data G' is output from both center pixels R and B. G' is interpolated green color pixel data.

Figures 1, 2:
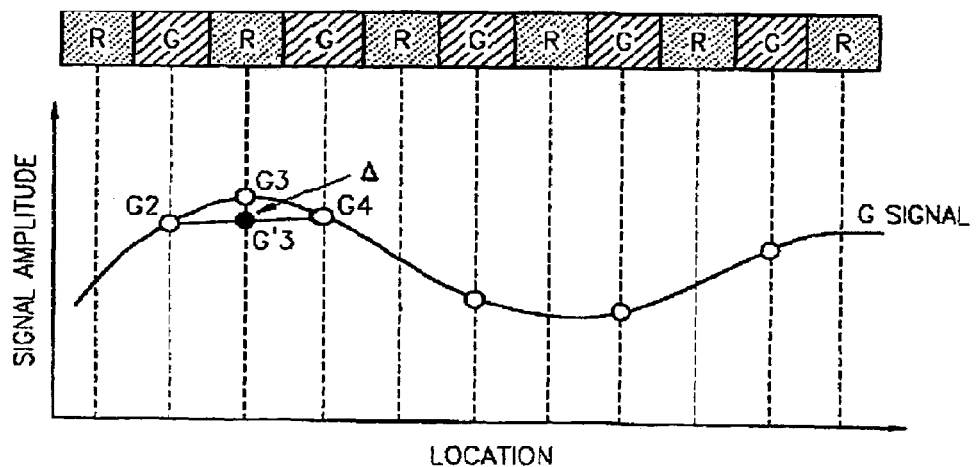
FIG. 1 is a diagram showing a Bayer pattern of a color filter array.
FIG. 2 is a schematic diagram of an example illustrating linear interpolation method of the related art for interpolating the amplitude of a pixel filtered by a Bayer pattern color filter array.

The reason why vertical/horizontal BPF filtering is applied after horizontal/vertical linear LPF filtering, as shown in FIG. 4, is that in a location which is desired to be vertical/horizontal BPF filtered on the Bayer pattern as shown in FIG. 1, there is no pixel data (in the horizontal pixel sequence) indicating the color that is desired to be obtained. This rationale is based on an assumption that original signals (G, R) and linear LPF filtered signals ($G_{LPF}$, $R_{LPF}$) have almost the same difference ratios on the identical locations, as shown in FIG. 5.

Figure 6:
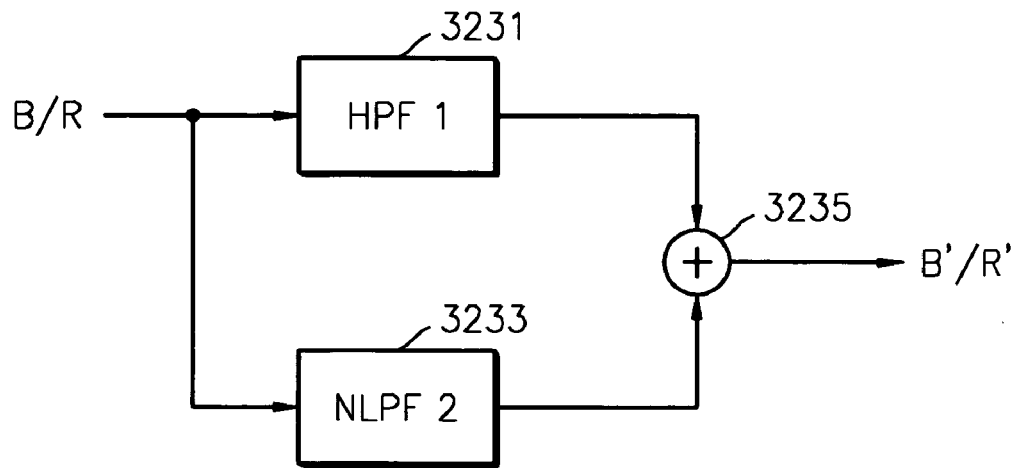
FIG. 6 is a detailed block diagram of a second interpolator of the digital image signal processor of FIG. 3.

Referring to FIGS. 3 and 6, the second interpolator 323 receives the 5×5 pixel data window, performs the second interpolation from each of center pixels R and B, in which: pixel data are HPF filtered by an HPF 3231; and data are nonlinear LPF filtered by a nonlinear LPF (NLPF) 3233; and the filtered data outputs are added by an adder 3235 that outputs interpolation data B' or R'. Here, interpolation data B' is output from the center pixel R and interpolation data R' is output from the center pixel B. B' is interpolated blue color pixel data and R' is interpolated red color pixel data.

Filtering by a horizontal linear low pass filter (HLLPF), by a vertical linear low pass filter (VLLPF), by a horizontal band pass filter (HBPF), by a vertical band pass filter (VBPF), and by a high pass filter (HPF) will now be explained.

Figure 7:
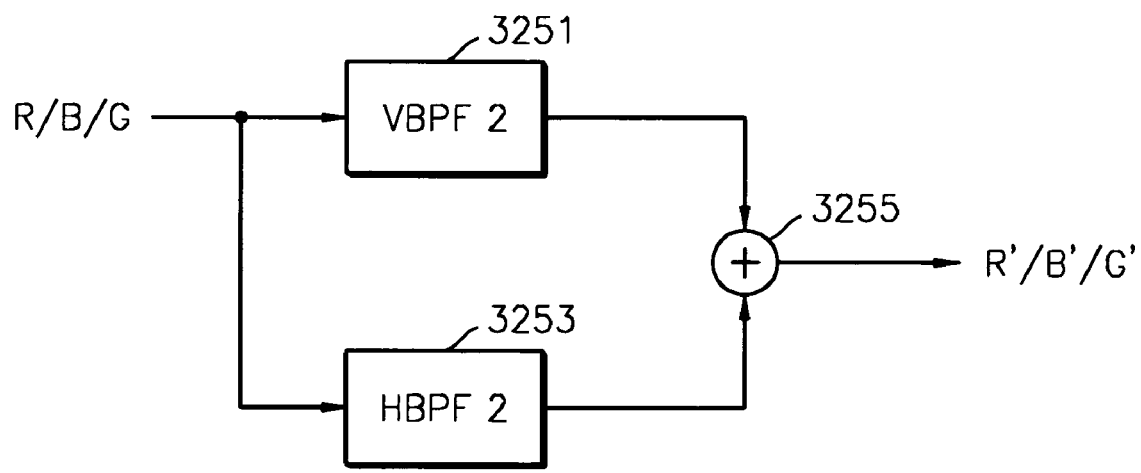
FIG. 7 is a detailed block diagram of a third interpolator of the digital image signal processor of FIG. 3.

Referring to FIGS. 3 and 7, the third interpolator 325 receives the 5×5 pixel data window, performs the third interpolation from each of center pixels R, B, and G, in which: pixel data are vertical BPF filtered by a vertical BPF (VBPF) 3251; and data are horizontal BPF filtered by a horizontal BPF (HBPF) 3253; and the filtered data outputs are added by an adder 3255 that outputs interpolation data R', B', or G'. Here, interpolation data R' is output from the center pixel R, interpolation data B' is output from the center pixel B, and interpolation data G' is output for center pixel G (Gr and Gb).

Figure 8:
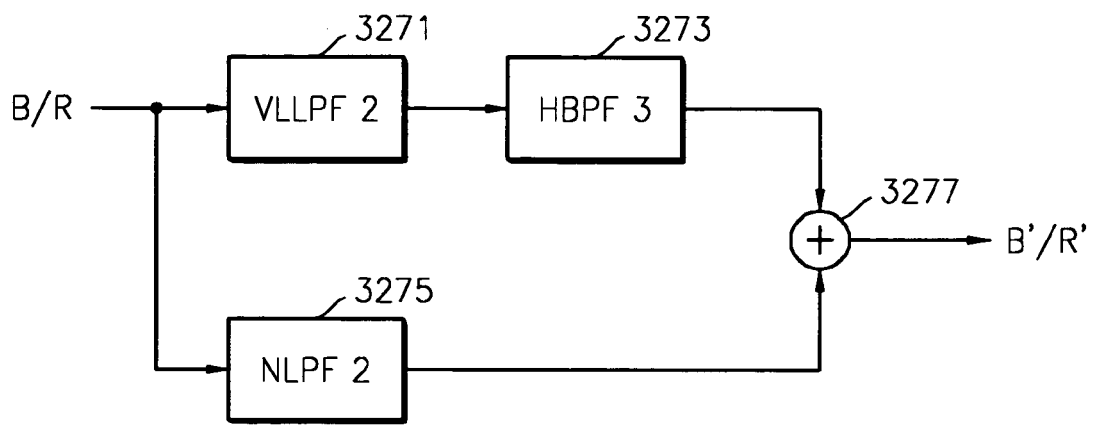
FIG. 8 is a detailed block diagram of a fourth interpolator of the digital image signal processor of FIG. 3.

Referring to FIGS. 3 and 8, the fourth interpolator 327 receives the 5×5 pixel data window an performs the fourth interpolation from each of center pixels Gr and Gb, in which: data are vertical linear LPF filtered by a vertical LPF (VLLPF) 3271 and horizontal BPF filtered by a HBPF 3273; and data are nonlinear LPF filtered by a nonlinear LPF (NLPF) 3275; and the filtered data outputs are added by an adder 3277 that outputs interpolation data B' or R'. Here, interpolation data B' is output from the center pixel Gr and interpolation data R' is output from the center pixel Gb.

Figure 9:
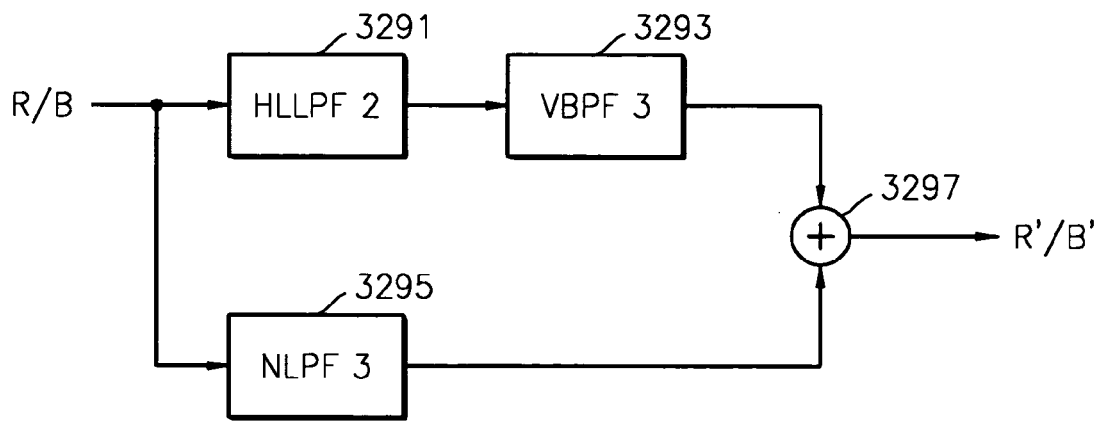
FIG. 9 is a detailed block diagram of a fifth interpolator of the digital image signal processor of FIG. 3.

Referring to FIGS. 3 and 9, the fifth interpolator 329 receives the 5×5 pixel data window, performs the fifth inter polation from each of center pixels Gr and Gb, in which: data are horizontal linear LPF filtered by a horizontal linear LPF (HLLPF) 3291 and vertical BPF filtered by a vertical BPF (VBPF) 3293; and data are nonlinear LPF filtered by a nonlinear LPF (NLPF) 3295; and the filtered data output are added by an adder 3297 that outputs interpolation data R' or B'. Here, interpolation data R' is output from the center pixel Gr and interpolation data Gb is output from interpolation data B'.

Figures 10, 11, 12:
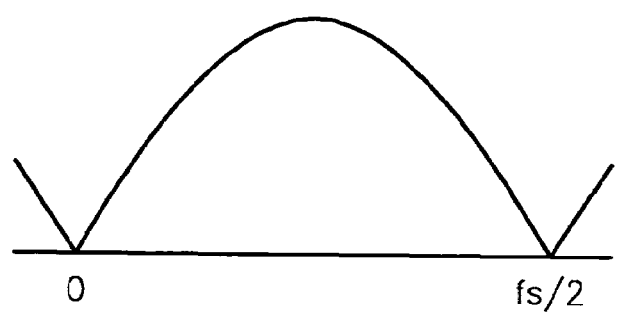
FIG. 10 is a diagram showing weights of a horizontal band pass filter ("HBPF" in FIGS. 4, 7, and 8) and a vertical band pass filter ("VBPF" in FIGS. 4, 7, and 9)
FIG. 11 is a diagram for explaining the bandwidth of a band pass filter ("BPF")
FIG. 12 is a diagram showing weights of a horizontal linear low pass filter ("HLLPF" in FIGS. 4 and 9) and a vertical linear low pass filter ("VLLPF" in FIGS. 4 and 8)

FIG. 10 is a diagram showing weights of a horizontal band pass filter ("HBPF" in FIGS. 4, 7, and 8) and a vertical band pass filter ("VBPF" in FIGS. 4, 7, and 9).

Referring to FIG. 10: the horizontal BPF filtering is multiplying pixel data in the row to which the center pixel belongs in the 5×5 pixel data window, by the horizontal BPF filtering weight (−1 0 2 0 −1) and then averaging the result. For example, if the pixel data in the row to which the center pixel belongs are $R_1$, $G_1$, $R_2$, $G_2$, $R_3$, and if the horizontal BPF filtering weight (−1 0 2 0 −1) is multiplied, the result is $-R_1$, 0, $2R_2$, 0, $-R_3$, and the average is $(-R_1+2R_2-R_3)/4$. The vertical BPF filtering is multiplying pixel data in the column to which the center pixel belongs in the 5×5 pixel data window, by vertical BPF filtering weight $$\begin{pmatrix} -1 \\ 0 \\ 2 \\ 0 \\ -1 \end{pmatrix},$$

and then averaging the result. The reason that the horizontal BPF filtering and the vertical BPF filtering are used is that according to the sampling theory, as shown in FIG. 11, the signal area equal to or greater than $f_s/2$ (wherein $f_s$ denotes a sampling frequency) is not restored well.

FIG. 12 is a diagram showing weights (coefficients) of a horizontal linear low pass filter ("HLLPF" in FIGS. 4 and 9) and a of vertical linear low pass filter ("VLLPF" in FIGS. 4 and 8).

Referring to FIG. 12, the horizontal linear LPF filtering is performed by multiplying pixel data in each of first, third, and fifth rows in the 5×3 pixel data neighboring the center pixel in the 5×5 pixel data window, by horizontal LPF filtering weight (1 0 1), averaging the result, and taking the average value as the center value of the row. The vertical linear LPF filtering is performed by multiplying pixel data in each of first, third, and fifth columns in the 3×5 pixel data neighboring the center pixel in the 5×5 window pixel data, by vertical LPF filtering weight $$\begin{pmatrix} 1 \\ 0 \\ 1 \end{pmatrix},$$

averaging the result, and taking the average value as the center value of the column.

For example, if the 5×3 pixel data neighboring the center pixel is $$\begin{pmatrix} Ga & Ra & Gb \\ Ba & Gc & Bb \\ Gd & Rb & Ge \\ Bc & Gf & Bd \\ Gg & Rc & Gh \end{pmatrix},$$

and if pixel data in each of first, third, and fifth rows are multiplied by horizontal LPF filtering weight (1 0 1), the result is $$\begin{pmatrix} Ga & 0 & Gb \\ Gd & 0 & Ge \\ Gg & 0 & Gh \end{pmatrix}$$

and taking the average value as the center value of each column can be expressed as $$\begin{pmatrix} (Ga+Gb)/2 \\ (Gd+Ge)/2 \\ (Gg+Gh)/2 \end{pmatrix}.$$

FIG. 13 is a diagram showing a weights (coefficients) of a high pass filter ("HPF" in FIG. 6).

Referring to FIG. 13, the HPF filtering is performed by multiplying 3×3 pixel data centered around the center pixel in the 5×5 pixel data window by HPF filtering weights $$\begin{pmatrix} -1 & 0 & -1 \\ 0 & 4 & 0 \\ -1 & 0 & -1 \end{pmatrix},$$

and then averaging the result.

For example, if the 3×3 pixel data neighboring the center pixel are $$\begin{pmatrix} Ga & Ra & Gb \\ Ba & Gc & Bb \\ Gd & Rb & Ge \end{pmatrix},$$

the average value obtained after multiplication of the HPF filtering weight is $(-Ga-Gb-Gd-Ge+4Gc)/8$.

When these LPF and BPF having linear characteristics are applied, aliasing is reduced and by applying the HPF, interpolation data emphasizing a high frequency component can be generated.

FIG. 14 is a diagram showing coordinates centered around a center pixel, $C_{y,x}$, to explain a gradation determination method of a nonlinear low pass filter (NLPF). Thus, in FIG. 14, $C_{y,x}$ denotes a pixel in y-th row and x-th column as the center pixel of the 5×5 window.

In FIG. 14, the nonlinear LPF filtering, in order to obtain $C_{y,x}$ is performed by outputting interpolation data G' and B' for center pixel R, outputting interpolation data G' and R' for center pixel B, and outputting interpolation data B' and R' from both center pixels Gr and Gb. As shown in table 1, from the 5×5 pixel data window: interpolation data G' and B' for center pixel R are output by performing equations 1 and 2, respectively; interpolation data G' and R' for center pixel B are output by performing equations 1 and 2, respectively; and interpolation data B' and R' from both center pixels Gr and Gb are output by performing equations 3 and 4, respectively.

TABLE 1

|    | Center pixel R | Center pixel B | Center pixel Gr | Center pixel Gb |
|----|----------------|----------------|-----------------|-----------------|
| R' |                | Equation 2     | Equation 4      | Equation 4      |
| G' | Equation 1     | Equation 1     |                 |                 |
| B' | Equation 2     |                | Equation 3      | Equation 3      |

The equations 1 through 4 referred to in Table 1 are as follows: wherein a1 through a8 in the equations 1 through 4 are calculated according to the following equations 5 through 12, and $D_{y+a,x+b}$ and D1 through D8 are calculated according to the following equations 13 through 17, respectively:

$$C_{y,x} = \frac{(a_1 C_{y-1,x} + a_3 C_{y,x+1} + a_5 C_{y+1,x} + a_7 C_{y,x-1})}{(a_1 + a_3 + a_5 + a_7)} \quad (1)$$

$$C_{y,x} = \frac{(a_2 C_{y-1,x+1} + a_4 C_{y+1,x+1} + a_6 C_{y+1,x-1} + a_8 C_{y-1,x-1})}{(a_2 + a_4 + a_6 + a_8)} \quad (2)$$

$$C_{y,x} = \frac{(a_1 C_{y-1,x} + a_5 C_{y+1,x})}{(a_1 + a_5)} \quad (3)$$

$$C_{y,x} = \frac{(a_3 C_{y,x+1} + a_7 C_{y,x-1})}{(a_3 + a_7)} \quad (4)$$

$$a_1 = \frac{1}{(1 + D_{y-1,x} + D_1/8)} \quad (5)$$

$$a_2 = \frac{1}{(1 + D_{y-1,x+1} + D_2/8)} \quad (6)$$

$$a_3 = \frac{1}{(1 + D_{y,x+1} + D_3/8)} \quad (7)$$

$$a_4 = \frac{1}{(1 + D_{y+1,x+1} + D_4/8)} \quad (8)$$

$$a_5 = \frac{1}{(1 + D_{y+1,x} + D_5/8)} \quad (9)$$

$$a_6 = \frac{1}{(1 + D_{y+1,x-1} + D_6/8)} \quad (10)$$

$$a_7 = \frac{1}{(1 + D_{y,x-1} + D_7/8)} \quad (11)$$

$$a_8 = \frac{1}{(1 + D_{y-1,x-1} + D_8/8)} \quad (12)$$

$$D_{y+a,x+b} = \left| \frac{(C_{y+2a,x+2b} - C_{y,x})}{(2a + 2b)} \right| \quad (13)$$

$$D_1 = D_5 = \left| \frac{(C_{y-1,x} - C_{y+1,x})}{2} \right| \quad (14)$$

$$D_2 = D_6 = \left| \frac{(C_{y-1,x+1} - C_{y+1,x-1})}{4} \right| \quad (15)$$

$$D_3 = D_7 = \left| \frac{(C_{y,x+1} - C_{y,x-1})}{2} \right| \quad (16)$$

$$D_4 = D_8 = \left| \frac{(C_{y+1,x+1} - C_{y-1,x-1})}{4} \right| \quad (17)$$

wherein a, b are integer numbers.

As shown in equations 5 through 17, in the nonlinear LPF filtering, the change rate of the data neighboring a center pixel and the data of the center pixel is reflected and interpolation data close to actual pixel data are generated.

As described above, the color signal interpolator 320 according to a preferred embodiment of the present invention comprises the first through fifth interpolators 321 through 329, receiving 5×5 pixel data window, performing the first through fourth group interpolations from each of pixels R, B, Gr, and Gb, and outputs interpolation data G', B', and R' for each center pixel. In the interpolation processes, the LPF, BPF, and HPF filtering having structures of a linear characteristic unlike the prior art are applied and in particular, nonlinear LPF filtering is applied. Interpolation data G', B', and R' being processed can be displayed as a color image data on a screen.

As described above, the digital image signal processor according to the present invention can generate interpolation data close to actual pixel data by applying a nonlinear low pass filter (LPF) that reflects the change rate of the data centered about a center pixel and the data of the center pixel, and by simultaneously applying a LPF, a band pass filter (BPF), and a high pass filter (HPF) having linear characteristics, and can generate interpolation data which reduces aliasing and emphasizes a high frequency component. Accordingly, the display resolution is improved by using this generated interpolation data.

Exemplary embodiments of the invention have been explained above and are shown in the figures. However, the present invention is not limited to the exemplary embodiments described above, and it is apparent that variations and modifications can be effected by those skilled in the art within the spirit and scope of the present invention. Therefore, the exemplary embodiments should be understood not as limitations but as examples. The scope of the present invention is not determined by the above description but by the accompanying claims and variations and modifications may be made to the embodiments of the invention without departing from the scope of the invention as defined by the appended claims and equivalents.

What is claimed is:

1. A color signal interpolator comprising:
    a first interpolator which receives 5×5 pixel window data, and performs a first interpolation for each of center pixels R and B, wherein the data are horizontal linear low pass filter (LPF) filtered and vertical band pass filter (BPF) filtered, and the data are also vertical linear LPF filtered and horizontal BPF filtered, and the data are also nonlinear LPF filtered, and the sum of the filtered data is output as first interpolation data G';
    a second interpolator which receives the 5×5 pixel window data, and performs a second interpolation for each of center pixels R and B, wherein the data are high pass filter (HPF) filtered, and the data are also nonlinear LPF filtered and the sum of the filtered data is output as second interpolation data B' and R', respectively;
    a third interpolator which receives the 5×5 pixel window data, and performs a third interpolation for each of center pixels R, B, and G, wherein the data are vertical BPF filtered, and the data are also horizontal BPF filtered, and the sum of the filtered data is output as third interpolation data R', B', or G', respectively;

a fourth interpolator which receives the 5×5 pixel window data, and performs fourth interpolation for each of center pixels Gr and Gb, wherein the data are vertical linear LPF filtered and horizontal BPF filtered, and the data are also nonlinear LPF filtered, and the sum of the filtered data is output as fourth interpolation data B' or R', respectively; and a fifth interpolator which receives the 5×5 pixel window data, and performs fifth interpolation for each of center pixels Gr and Gb, wherein the data are horizontal linear LPF filtered and vertical BPF filtered, and the data are also nonlinear LPF filtered, and the sum of the filtered data is output as fifth interpolation data R' or B'.

2. The color signal interpolator of claim 1, wherein the horizontal linear LPF filtering is performed by multiplying the pixel data in each of the first, third, and fifth rows in 5×3 pixel data centered around the center pixel in the 5×5 pixel window data, by the horizontal linear LPF filtering weight (1 0 1), and averaging the value thereof, and setting the average value as the center value of a row; and the vertical linear LPF filtering is performed by multiplying the pixel data in each of first, third, and fifth columns in the 3×5 pixel data centered around the center pixel in the 5×5 pixel window, by the vertical LPF filtering weight $$\begin{pmatrix} 1 \\ 0 \\ 1 \end{pmatrix},$$

and averaging the product thereof, and setting the average product as the center value of a column.

3. The color signal interpolator of claim 1, wherein the horizontal BPF filtering is performed by multiplying pixel data in a row to which the center pixel belongs within the 5×5 pixel window data, by the horizontal BPF filtering weight (−1 0 2 0 −1) and then averaging a result, and the vertical BPF filtering is performed by multiplying pixel data in a column to which the center pixel belongs within the 5×5 pixel window, by the vertical BPF filtering weight $$\begin{pmatrix} -1 \\ 0 \\ 2 \\ 0 \\ -1 \end{pmatrix},$$

and then averaging a product thereof.

4. The color signal interpolator of claim 1, wherein the HPF filtering is performed by multiplying the 3×3 pixel data centered around the center pixel in the 5×5 pixel window data by the HPF filtering weight $$\begin{pmatrix} -1 & 0 & -1 \\ 0 & 4 & 0 \\ -1 & 0 & -1 \end{pmatrix},$$

and then averaging a product.

5. The color signal interpolator of claim 1, wherein the nonlinear LPF filtering of the 5×5 pixel window data is performed by outputting interpolation data G' and B' by performing equations 1 and 2, respectively, for center pixel R; outputting interpolation data G' and R' by performing the equations 1 and 2, respectively, for center pixel B; and outputting interpolation data B' and R' by performing equations 3 and 4, respectively, for both center pixels Gr and Gb, wherein the equations 1 through 4 are:

$$C_{y,x} = \frac{(a_1 C_{y-1,x} + a_3 C_{y,x+1} + a_5 C_{y+1,x} + a_7 C_{y,x-1})}{(a_1 + a_3 + a_5 + a_7)} \quad (1)$$

$$C_{y,x} = \frac{(a_2 C_{y-1,x+1} + a_4 C_{y+1,x+1} + a_6 C_{y+1,x-1} + a_8 C_{y-1,x-1})}{(a_2 + a_4 + a_6 + a_8)} \quad (2)$$

$$C_{y,x} = \frac{(a_1 C_{y-1,x} + a_5 C_{y+1,x})}{(a_1 + a_5)} \quad (3)$$

$$C_{y,x} = \frac{(a_3 C_{y,x+1} + a_7 C_{y,x-1})}{(a_3 + a_7)} \quad (4)$$

where $C_{y,x}$ denotes a pixel data in y-th row and x-th column within the 5×5 pixel window data centered around the center pixel; and a1 through a8, $D_{y+a, x+b}$ and D1 through D8 are calculated by the following equations:

$$a_1 = \frac{1}{(1 + D_{y-1,x} + D_1/8)} \quad a_2 = \frac{1}{(1 + D_{y-1,x+1} + D_2/8)}$$

$$a_3 = \frac{1}{(1 + D_{y,x+1} + D_3/8)} \quad a_4 = \frac{1}{(1 + D_{y+1,x+1} + D_4/8)}$$

$$a_5 = \frac{1}{(1 + D_{y+1,x} + D_5/8)} \quad a_6 = \frac{1}{(1 + D_{y+1,x} + D_5/8)}$$

$$a_7 = \frac{1}{(1 + D_{y,x-1} + D_7/8)} \quad a_8 = \frac{1}{(1 + D_{y-1,x-1} + D_8/8)}$$

$$D_{y+a,x+b} = \left| \frac{(C_{y+2a,x+2b} - C_{y,x})}{(2a + 2b)} \right|$$

$$D_1 = D_5 = \left| \frac{(C_{y-1,x} - C_{y+1,x})}{2} \right| \quad D_2 = D_6 = \left| \frac{(C_{y-1,x+1} - C_{y+1,x-1})}{4} \right|$$

$$D_3 = D_7 = \left| \frac{(C_{y,x+1} - C_{y,x-1})}{2} \right| \quad D_4 = D_8 = \left| \frac{(C_{y+1,x+1} - C_{y-1,x-1})}{4} \right|$$

wherein a, b are integer numbers.

wherein a, b are integer numbers.

6. A digital image signal processor comprising:

a memory unit that receives input pixel data, updates and stores the pixel data of 5 pixel lines or more, and according to the control of a control signal, outputs 5×5 pixel window data centered on a center pixel;

a color signal interpolator that performs first group interpolation through fourth group interpolation, according to the control of the control signal, wherein: in the first group interpolation, interpolation data G', B', and R' are output through first interpolation, second interpolation, and third interpolation, respectively, for center pixel R within the 5×5 pixel window data; in the second group interpolation, interpolation data G', R', and B' are output through the first interpolation, the second interpolation, and the third interpolation, respectively, for center pixel B within the 5×5 pixel window data; in the third group interpolation, interpolation data G', B', and R' are output through the third interpolation, fourth interpolation, and fifth interpolation, respectively, for center pixel Gr within the 5×5 pixel window data; and in the fourth group interpolation, interpolation data G', R', and B' are output through the third interpolation, the fourth interpolation, and the fifth interpolation, respectively, for center pixel Gb within the 5×5 pixel window data; and a control unit that determines which color among colors R, B, Gr, and Gb the center pixel is, and according to the color of the center pixel, generates the control signal indicating the first group interpolation through the fourth group interpolation.

7. The digital image signal processor of claim 6, wherein the color signal interpolator comprises:

a first interpolator which receives the 5×5 pixel window data, performs the first interpolation for each of the center pixels R and B, wherein the data are horizontal linear LPF filtered and vertical BPF filtered; the data are also vertical linear LPF filtered and horizontal BPF filtered; and the data are also nonlinear LPF filtered; and the sum of the filtered data is output as the interpolation data G';

a second interpolator which receives the 5×5 pixel window data, performs the second interpolation from each of the center pixels R and B, wherein the data are HPF filtered and the data are also nonlinear LPF filtered, and the sum of the filtered data is output as the interpolation data B' or R', respectively;

a third interpolator which receives the 5×5 pixel window data, performs the third interpolation from each of the center pixels R, B, and G, wherein the data are vertical BPF filtered, and the data are also horizontal BPF filtered, and the sum of the filtered data is output as the interpolation data R', B', or G', respectively;

a fourth interpolator which receives the 5×5 pixel window data, performs fourth interpolation from each of the center pixels Gr and Gb, wherein the data are vertical linear LPF filtered and horizontal BPF filtered, and the data are also nonlinear LPF filtered, and the sum of the filtered data is output as the interpolation data B' or R', respectively; and a fifth interpolator which receives the 5×5 pixel window data, performs fifth interpolation from each of the center pixels Gr and Gb, wherein the data are horizontal linear LPF filtered and vertical BPF filtered, and the data are also nonlinear LPF filtered and the sum of the filtered data is output as the interpolation data R' or B', respectively.

8. A color signal interpolation method comprising:

receiving 5×5 pixel window data, performing first interpolation from each of center pixels R and B, in which the data that are horizontal linear low pass filter (LPF) filtered and vertical band pass filter (BPF) filtered, the data are also vertical linear LPF filtered and horizontal BPF filtered, and the data are also nonlinear LPF filtered are added, and outputting interpolation data G';

receiving the 5×5 pixel window data, performing second interpolation from each of center pixels R and B, in which the data that are high pass filter (HPF) filtered and the data that are also nonlinear LPF filtered are added, and outputting interpolation data B' or R', respectively;

receiving the 5×5 pixel window data, performing third interpolation from each of center pixels R, B, and G, in which the data are vertical BPF filtered and the data that are also horizontal BPF filtered are added, and outputting interpolation data R', B', or G', respectively;

receiving the 5×5 pixel window data, performing fourth interpolation from each of center pixels Gr and Gb, in which the data that are vertical linear LPF filtered and horizontal BPF filtered, and the data that are also nonlinear LPF filtered are added, and outputting interpolation data B' or R', respectively; and receiving the 5×5 pixel window data, performing fifth interpolation from each of center pixels Gr and Gb, in which the data that are horizontal linear LPF filtered and vertical BPF filtered, and the data that are also nonlinear LPF filtered are added, and outputting interpolation data R' or B', respectively.

9. The color signal interpolation method of claim 8, wherein: the horizontal linear LPF filtering is performed by multiplying the pixel data in each of first, third, and fifth rows in the 5×3 pixel data centered around the center pixel in the 5×5 pixel window data, by the horizontal linear LPF filtering weight (1 0 1), and averaging a value, and setting the average value as the center value of a row; and the vertical linear LPF filtering is performed by multiplying pixel data in each of first, third, and fifth columns in the 3×5 pixel data centered around the center pixel in the 5×5 pixel window, by the vertical LPF filtering weight $$\begin{pmatrix} 1 \\ 0 \\ 1 \end{pmatrix},$$

and averaging the product, and setting the average product as the center value of a column.

10. The color signal interpolation method of claim 8, wherein: the horizontal BPF filtering is performed by multiplying pixel data in a row to which the center pixel belongs in the 5×5 pixel window data, by the horizontal BPF filtering weight (−1 0 2 0 −1) and then averaging a product; and the vertical BPF filtering is performed by multiplying pixel data in a column to which the center pixel belongs in the 5×5 pixel window data, by the vertical BPF filtering weight $$\begin{pmatrix} -1 \\ 0 \\ 2 \\ 0 \\ -1 \end{pmatrix},$$

and then averaging a product.

11. The color signal interpolation method of claim 8, wherein the HPF filtering is performed by multiplying 3×3 pixel data centered around the center pixel in the 5×5 pixel window data by the HPF filtering weight $$\begin{pmatrix} -1 & 0 & -1 \\ 0 & 4 & 0 \\ -1 & 0 & -1 \end{pmatrix},$$

and then averaging a product.

12. The color signal interpolator of claim 8, wherein the nonlinear LPF filtering of the 5×5 pixel window data is performed by outputting interpolation data G' and B' by performing equations 1 and 2, respectively, for center pixel R; outputting interpolation data G' and R' by performing the equations 1 and 2, respectively, for center pixel B; and outputting interpolation data B' and R' by performing equations 3 and 4, respectively, for both center pixels Gr and Gb, wherein the equations 1 through 4 are:

$$C_{y,x} = \frac{(a_1 C_{y-1,x} + a_3 C_{y,x+1} + a_5 C_{y+1,x} + a_7 C_{y,x-1})}{(a_1 + a_3 + a_5 + a_7)} \quad (1)$$

$$C_{y,x} = \frac{(a_2 C_{y-1,x+1} + a_4 C_{y+1,x+1} + a_6 C_{y+1,x-1} + a_8 C_{y-1,x-1})}{(a_2 + a_4 + a_6 + a_8)} \quad (2)$$

$$C_{y,x} = \frac{(a_1 C_{y-1,x} + a_5 C_{y+1,x})}{(a_1 + a_5)} \quad (3)$$

$$C_{y,x} = \frac{(a_3 C_{y,x+1} + a_7 C_{y,x-1})}{(a_3 + a_7)} \quad (4)$$

where $C_{y,x}$ denotes a pixel data in y-th row and x-th column of the 5×5 pixel window data centered around the center pixel; and a1 through a8, $D_{y+a, x+b}$ and D1 through D8 are calculated by the following equations:

$$a_1 = \frac{1}{(1 + D_{y-1,x} + D_1/8)} \quad a_2 = \frac{1}{(1 + D_{y-1,x+1} + D_2/8)}$$

$$a_3 = \frac{1}{(1 + D_{y,x+1} + D_3/8)} \quad a_4 = \frac{1}{(1 + D_{y+1,x+1} + D_4/8)}$$

$$a_5 = \frac{1}{(1 + D_{y+1,x} + D_5/8)} \quad a_6 = \frac{1}{(1 + D_{y+1,x} + D_5/8)}$$

$$a_7 = \frac{1}{(1 + D_{y,x-1} + D_7/8)} \quad a_8 = \frac{1}{(1 + D_{y-1,x-1} + D_8/8)}$$

$$D_{y+a,x+b} = \left| \frac{(C_{y+2a,x+2b} - C_{y,x})}{(2a + 2b)} \right|$$

$$D_1 = D_5 = \left| \frac{(C_{y-1,x} - C_{y+1,x})}{2} \right| \quad D_2 = D_6 = \left| \frac{(C_{y-1,x+1} - C_{y+1,x-1})}{4} \right|$$

$$D_3 = D_7 = \left| \frac{(C_{y,x+1} - C_{y,x-1})}{2} \right| \quad D_4 = D_8 = \left| \frac{(C_{y+1,x+1} - C_{y-1,x-1})}{4} \right|$$

wherein a, b are integer numbers.

wherein a, b are integer numbers.

13. A digital image signal processing method comprising:
receiving input pixel data, storing the pixel data of 5 pixel lines or more, and according to the control of a control signal, outputting 5×5 pixel window data centered around a center pixel;
performing color signal interpolation by performing first group interpolation through fourth group interpolation according to the control of the control signal, wherein: in the first group interpolation, interpolation data G', B', and R' are output through first interpolation, second interpolation, and third interpolation, respectively, using the 5×5 pixel window data for center pixel R; in the second group interpolation, interpolation data G', R', and B' are output through the first interpolation, the second interpolation, and the third interpolation, respectively, using the 5×5 pixel window data for center pixel B; in the third group interpolation, interpolation data G', B', and R' are output through the third interpolation, fourth interpolation, and fifth interpolation, respectively, using the 5×5 pixel window data for center pixel Gr; and in the fourth group interpolation, interpolation data G', R', and B' are output through the third interpolation, the fourth interpolation, and the fifth interpolation, respectively, using the 5×5 pixel window data for center pixel Gb; and
and according to the color of the center pixel among colors R, B, Gr, and Gb, generating the control signal indicating the first group interpolation through the fourth group interpolation.

14. The digital image signal processing method of claim 13, wherein performing color signal interpolation comprises:
receiving the 5×5 pixel window data, performing the first interpolation from each of the center pixels R and B, wherein the data are horizontal linear LPF filtered and vertical BPF filtered, and the data are also vertical linear LPF filtered and horizontal BPF filtered, and the data are also nonlinear LPF filtered, and the sum of the filtered data is output as the interpolation data G';
receiving the 5×5 pixel window data, performing the second interpolation for each of the center pixels R and B, wherein the data are HPF filtered, and the data are also nonlinear LPF filtered, and the sum of the filtered data is output as the interpolation data B' or R';
receiving the 5×5 pixel window data, performing the third interpolation for each of the center pixels R, B, and G, wherein the data are vertical BPF filtered, and the data are also horizontal BPF filtered, and the sum of the filtered data is output as the interpolation data R', B', or G';
receiving the 5×5 pixel window data, performing the fourth interpolation for each of the center pixels Gr and Gb, wherein the data are vertical linear LPF filtered and horizontal BPF filtered; and the data are also nonlinear LPF filtered, and the sum of the filtered data is output as the interpolation data B' or R'; and
receiving the 5×5 pixel window data, performing the fifth interpolation for each of the center pixels Gr and Gb, wherein the data are horizontal linear LPF filtered and vertical BPF filtered; and the data are also nonlinear LPF filtered, and the sum of the filtered data is output as the interpolation data R' or B'.

* * * * *